United States Patent Office 3,455,964
Patented July 15, 1969

3,455,964
DIHYDROFURAN DERIVATIVES
George B. Payne, Berkeley, Calif., assignor to Shell Oil Company, New York, N.Y., a corporation of Delaware
No Drawing. Filed June 27, 1966, Ser. No. 560,798
Int. Cl. C07d 5/10; C08h 17/22
U.S. Cl. 260—347.4
14 Claims

ABSTRACT OF THE DISCLOSURE

Novel 4-acyl-2,3-dihydrofuran derivatives, useful as selective solvents, are produced by reaction of stabilized sulfur ylids with 1,1-diacyl-α-olefins. These compounds are useful in the separation of aromatics from mixtures of similarly-boiling paraffins and aromatics.

---

This invention relates to an improved process of producing certain 4-acyl-2,3-dihydrofuran derivatives and to the novel products thereby produced.

PRIOR ART

Methods of producing and reacting sulfur ylids are known in the art. For example, Speziale et al., J. Am. Chem. Soc., 87, 3462 (1965), produce sulfur ylids in situ by reaction of sulfonium halides with sodium hydride in ether solution, which ylids are subsequently reacted with Schiff's bases. Applicant's copending application U.S. Ser. No. 531,212 filed May 19, 1966, now U.S. Patent 3,397,-223, discloses and claims a process of producing substituted cyclopropane derivatives by reacting certain stable sulfur ylids with a variety of olefinic reactants wherein the ethylenic double bond is activated by the presence of an electron-withdrawing group of varied type as a substituent of at least one of the ethylenic carbon atoms.

OBJECTS

It is an object of the present invention to provide an improved process of producing certain derivatives of 4-acyl-2,3-dihydrofuran and the novel 4-acyl-2,3-dihydrofuran products. More particularly, it is an object to provide novel 4-acyl-2,3-dihydrofuran derivatives of additional ring substituents including an electron-withdrawing substituent in the 2 ring position.

THE INVENTION

It has now been found that these objects are accomplished by the process of intimately contacting certain stabilized sulfur ylids with 1,1-diacyl-α-olefins. In contrast with other activated olefins which lead to cyclopropane derivatives through reaction with the sulfur ylids, utilization of the diacyl olefins of the invention as reactants results in the formation of 4-acyl-2,3-dihydrofuran derivatives.

THE YLID

The sulfur reactant comprises a molecule incorporating a moiety represented by the following resonance forms.

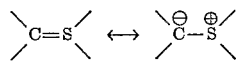

Although sulfur ylids of a variety of structural types are at least in part operable, the preferred class of sulfur ylids to be employed as a reactant in the process of the invention comprises ylids of up to 15 carbon atoms represented by the formula

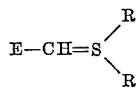

wherein E represents an electron-withdrawing group as is defined hereinbelow and R independently is lower alkyl, e.g., alkyl of up to 4 carbon atoms such as methyl, ethyl, propyl or butyl. It should be appreciated that the ylid molecule is the hybrid of several resonance structures involving polarization of the carbon-sulfur double bond and possible delocalization of any negative charge on the carbon atom by the neighboring E group and that as a result no single structure adequately describes the ylid molecule. For convenience, however, the ylid is described in terms of the above formula which represents one contributing structure.

By the term "electron-withdrawing group" as employed hereinabove to define the E substituent is meant a multiatom functional group which, when attached to an aromatic ring, is considered to be meta-directing and ring-deactivating. Illustrative of such groups are formyl, acyl, dialkylphosphono, carboxy, alkylsulfonyl, arylsulfonyl, alkylsulfonato, nitro, carbamyl, cyano, carbalkoxy and carbaryloxy. Preferred electron-withdrawing groups have up to 8 carbon atoms, are free from aliphatic unsaturation and active hydrogen atoms and comprise an atom of carbon by means of which the electron-withdrawing group is linked to the remaining moiety of the ylid and is additionally multiply bonded to an atom of atomic number 7 to 8 inclusive, i.e., nitrogen or oxygen. Representative of such preferred electron-withdrawing groups are cyano, carbalkoxy, carbaryloxy, alkanoyl, aryloyl and N,N-dialkylcarbamyl.

A variety of systems of nomenclature are applicable to the naming of the ylid reactants of the invention. As employed herein, the term "dialkylthioxo" is descriptive of the =SRR moiety. Thus, representative ylids include 2-(dimethylthioxo)acetophenone, methyl (dipropylthioxo)acetate, ethyl (dimethylthioxo)acetate, (dimethylthioxo)acetonitrile, N,N-diethyl(diethylthioxo)acetamide, phenyl (dimethylthioxo)acetate, α-(dimethylthioxo)acetone and (diethylthioxo)acrylonitrile. Particularly useful are ylids of the above formula wherein each R is methyl, especially when the E term represents cyano, acyl, e.g., alkanoyl or aryloyl, or carbohydrocarbonoxy, e.g., carbalkoxy or carbaryloxy.

The ylid reactants are most easily prepared by dehydrohalogenation of the corresponding sulfonium halide. For example, dehydrohalogenation of carbethoxymethyldimethylsulfonium bromide results in the production of ethyl (dimethylthioxo)acetate. One method of effecting dehydrohalogenation of the sulfonium halide precursor of the ylid reactant comprises reacting the sulfonium halide with alkali metal or alkali metal hydride under anhydrous conditions according to the method of Speziale et al., J. Am. Chem. Soc., 87, 3562 (1965). A more suitable method of effecting the dehydrohalogenation comprises reacting the sulfonium halide with an essentially saturated aqueous solution of alkali metal carbonate containing at least a stoichiometric amount of alkali metal hydroxide. This procedure is described more fully and is claimed in applicant's copending application U.S. Ser. No. 551,233, filed May 19, 1966.

THE DIACYL OLEFIN

The diacyl olefinic reactant comprises an α-olefin having acyl moieties as the sole substituents of the terminal carbon atom of the ethylenic linkage. One class of 1,1-diacyl-α-olefins comprises those olefins of up to 20 carbon atoms represented by the formula

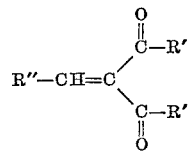

wherein R' is an organic moiety of up to 10 carbon atoms free from aliphatic unsaturation and active hydrogen atoms, and R" is hydrogen or R'. Preferred R' groups are hydrocarbyl, i.e., contain only atoms of carbon and hydrogen, or are halohydrocarbon additionally containing up to 3 halogen substituents, particularly halogen of atomic number from 9 to 35 inclusive, i.e., fluorine, chlorine or bromine. Generically, these preferred R' groups are termed (halo)hydrocarbyl of up to 10 carbon atoms and up to 3 halogens of atomic number from 9 to 35 inclusive.

Illustrative R' groups include hydrocarbon groups such as methyl, ethyl, propyl, butyl, hexyl, cyclohexyl, octyl, benzyl, phenyl tolyl and xylyl as well as halohydrocarbon groups such as trifluoromethyl, 3-chloropropyl, 2,4-dibromoheptyl, perchloroethyl and p-chlorophenyl. Preferred R' groups are lower alkyl, e.g., alkyl of up to 4 carbon atoms, particularly methyl. Exemplary diacyl olefinic reactants that are suitably employed include 3-ethylidene-2,4-pentanedione, 3-butylidene-2,4-pentanedione, 1,1-dibenzoyl-1-butene, 3-methylene-2,4-hexanedione, 4 - octylidene-3,5-heptanedione and 1-acetyl-1-benzoyl-1-pentene.

The molar ratio of the sulfur ylid to the diacyl olefinic reactant is not critical, and molar ratios of from about 5:1 to about 1:20 are satisfactory. It is generally desirable to provide an amount of the diacyl olefinic reactant that is at least stoichiometric and molar ratios of sulfur ylid to the diacyl olefinic reactant of from about 1:1 to about 1:5 are preferred.

THE PROCESS CONDITIONS

The sulfur ylid and the diacyl olefinic reactant are contacted in the liquid phase in the presence of or in the substantial absence of reaction solvent. Suitable reaction solvents, when solvent is to be employed, are capable of dissolving both reactants, are liquid at the reaction temperature and pressure employed and are inert to the reactants as well as the products produced therefrom. Illustrative of such reaction solvents are hydrocarbons such as hexane, heptane, isooctane, benzene, toluene, cyclohexane and tetrahydronaphthalene; halogenated hydrocarbons such as chloroform, carbon tetrachloride and methylene bromide; ketones, preferably lower alkanones, such as acetone, methyl ethyl ketone and methyl isobutyl ketone; ethers, including dialkyl ethers such as diethyl ether, dibutyl ether, and methyl hexyl ether, cyclic ethers such as tetrahydrofuran, 1,4-dioxane and 1,3-dioxolane, and ethers (full) of polyhydric alcohols or poly(oxyalkylene) glycols such as dimethoxyethane, diethylene glycol dimethyl ether and tetraethylene glycol dimethyl ether; lower alkyl esters of lower alkanoic acids such as ethyl acetate, methyl propionate and ethyl butyrate; sulfones and sulfoxides, e.g., methyl propyl sulfone, dibutyl sulfone, sulfolane and dimethyl sulfoxide; N,N'-dialkylamides such as dimethylformamide, dimethylacetamide and diethylacetamide; and nitriles including acetonitrile, propionitrile and benzonitrile. The amount of solvent is not critical, and when the physical properties of the reaction mixture will allow no solvent is required. It is generally preferred to employ a reaction solvent, however, and when solvent is utilized a molar amount of solvent up to about 20 times the molar amount of limiting reactant is satisfactory.

The method of providing contact between the ylid and the diacyl olefinic reactants is not material and one reactant may be added gradually to the other as by a slow addition of the ylid to the olefinic reactant, although it is equivalently useful to initially mix the entire amounts of reactants. The reaction of the ylid and the diacyl olefinic reactants is conducted at moderate temperatures and reaction temperatures from about 0° C. to about 150° C. are satisfactory. Preferred, however, are reaction temperatures from about 25° C. to about 120° C. The reaction is conducted at any convenient pressure, provided that the reaction mixture is maintained substantially in the liquid phase. Largely for reasons of convenience, the use of a substantially atmospheric pressure, e.g., from about 0.5 atmosphere to about 10 atmospheres, is preferred. Subsequent to reaction, the product mixture is separated and the desired dihydrofuran derivative is recovered by conventional methods, e.g., fractional distillation, selective extraction, fractional crystallization or the like.

The dihydrofuran derivatives of the invention are produced by reaction of the sulfur ylid and the ethylenic reactant in a 1:1 molecular ratio. Although it is not desired to be bound by any particular theory, it is believed probable that a polarized form of the ylid adds to the activated carbon-carbon double bond of the olefinic reactant to form a non-isolable dipolar intermediate which undergoes electron transfers, eliminates dialkyl sulfide and effects charge neutralization by ring closure. In any event, the dihydrofuran derivatives apparently result from combination of that moiety produced by removal of dialkylsulfide from the ylid reactant and the combination thereof with a moiety derived from the diacyl olefinic reactant. In terms of the preferred reactants as defined above, the process of the invention may be represented by the following equation

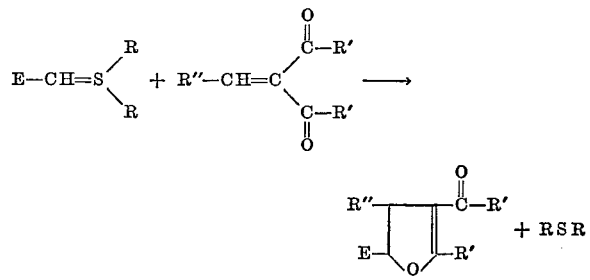

wherein E, R, R' and R" have the previously stated significance. In a specific example, ethyl (dimethylthioxo) acetate reacts with 3-ethylidene-2,4-pentanedione to produce ethyl 4-acetyl-3,5-dimethyl-2,3-dihydrofuran-2-carboxylate. Other illustrative dihydrofuran derivatives include 4-acetyl-2-cyano-3,5-dimethyl-2,3-dihydrofuran, 2,4-dibenzoyl-3-ethyl-5-phenyl - 2,3 - dihydrofuran, methyl 4-propionyl-3,5-diethyl-2,3-dihydrofuran - 2 - carboxylate, 4-acetyl-5-(p-chlorophenyl)-2-(N,N-dimethylcarbamyl) - 2,3-dihydrofuran, 3-butyl-2,4-diacetyl-5-methyl - 2,3 - dihydrofuran and 2-(p-bromobenzoyl)-3,5-dipropyl-4-hexanoyl-2,3-dihydrofuran.

The novel 4-acyl-2,3-dihydrofuran derivatives of the invention, as well as the corresponding tetrahydrofuran derivatives prepared by conventional catalytic hydrogenation of the ring unsaturation, are useful as selective solvents, particularly in the separation of aromatics from mixtures of similarly-boiling paraffins and aromatics. For example, ethyl 4-acetyl-3,5-dimethyl-2,3-dihydrofuran-2-carboxylate or 4-acetyl-2-cyano-3,5-dimethyl-2,3-dihydrofuran is useful in separating benzene from mixtures of benzene and C₆ paraffins or separating toluene from mixtures of toluene and C₇ paraffins.

To further illustrate the improved process of the invention and the novel products thereof, the following examples are provided. It should be understood that the details thereof are not to be regarded as limitations as they may be varied as will be understood by one skilled in this art.

EXAMPLE I

To a solution of 7.4 g. of ethyl (dimethylthioxo)acetate in 25 ml. of benzene was added a solution of 6.3 g. of 3-ethylidene-2,4-pentanedione in 25 ml. of benzene. An exothermic reaction caused the temperature of the reaction mixture to rise to 60° C. After standing overnight at room temperature, the product mixture was fractionally distilled at reduced pressure to give 8.4 g., an 83% yield, of ethyl 4-acetyl-3,5-dimethyl-2,3-dihydrofuran-2-carboxylate, B.P. 87–90° C. at less than 1 mm., $n_D^{25}$ 1.4761. The ultraviolet and nuclear magnetic resonance spectra of the product were consistent with the above structure and the product had the following elemental analysis.

*Analysis.*—Calc. (percent): C, 62.2; H, 7.6. Found (percent): C, 61.8; H, 7.7.

EXAMPLE II

By the procedure of Example I, 7.4 g. of ethyl (dimethylthioxo)acetate was reacted with 7.7 g. of 3-butylidene-2,4-pentanedione at 80° C. for 6 hours. The nuclear magnetic resonance spectrum of the product indicated the presence therein of ethyl-4-acetyl-5-methyl-3-propyl-2,3-dihydrofuran-2-carboxylate.

EXAMPLE III

The procedure of Example I was followed to react 9.0 g. of 2-(dimethylthioxo)acetophenone with 12.6 g. of 3-ethylidene-2,4-pentanedione at 80° C. for 4 hours. The product, 4-acetyl-2-benzoyl-3,5-dimethyl-2,3-dihydrofuran, B.P. 140–145° C. at 0.1 mm., $n_D^{25}$ 1.5580, was obtained in a yield of 50%.

EXAMPLE IV

The procedure of Example I was followed to react 7.0 g. of (dimethylthioxo)acetonitrile with 12.6 g. of 3-ethylidene-2,4-pentanedione in chloroform solution at 25° C. for 18 hours. The product, 4-acetyl-2-cyano-3,5-dimethyl-2,3-dihydrofuran, B.P. 80–81° C. at less than 1 mm., $n_D^{25}$ 1.4820, was obtained in a yield of 87%. The product had the following elemental analysis.

*Analysis.*—Calcd. (percent): C, 65.4; H, 6.7; N, 8.5. Found (percent): C, 65.3; H, 6.8; N, 7.8.

I claim as my invention:

1. The process of producing a 4-acyl-2,3-dihydrofuran compound by intimately contacting (a) the sulfur ylid of up to 15 carbon atoms of the formula

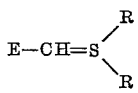

wherein E is an electron-withdrawing group of up to 8 carbon atoms and free from aliphatic unsaturation selected from alkanoyl, aryloyl, N,N-dialkylcarbamyl, cyano, carbalkoxy and carbaryloxy and R independently is alkyl of up to 4 carbon atoms, and (b) the diacyl olefin of up to 20 carbon atoms of the formula

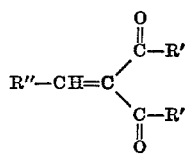

wherein R' is an organic moiety of up to 10 carbon atoms selected from hydrocarbon and halohydrocarbon of up to 3 halogens of atomic number from 9 to 35 inclusive free from aliphatic unsaturation and R" is hydrogen or R', in the liquid phase at a temperature from about 0° C. to about 150° C.

2. The process of claim 1 wherein R' is halohydrocarbon.
3. The process of claim 2 wherein R is methyl.
4. The process of claim 3 wherein R' is alkyl of up to 4 carbon atoms.
5. The process of claim 4 wherein each of R' and R" is methyl.
6. The process of claim 5 wherein E is carbalkoxy.
7. The process of claim 6 wherein E is carbethoxy.
8. The process of claim 5 wherein E is cyano.
9. The compound of up to 35 carbon atoms of the formula

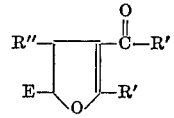

wherein E is an electron-withdrawing group of up to 8 carbon atoms and free from aliphatic unsaturation selected from alkanoyl, aryloyl, N,N-dialkylcarbamyl, cyano, carbalkoxy and carbaryloxy, R' is hydrocarbon of up to 10 carbon atoms free from aliphatic unsaturation or halohydrocarbon of up to 10 carbon atoms free from aliphatic unsaturation and up to 3 halogen substituents of atomic number from 9 to 35 inclusive, and R" is hydrogen or R'.

10. The compound of claim 9 wherein R' is alkyl of up to 4 carbon atoms.
11. The compound of claim 10 wherein each of R' and R" is methyl.
12. The compound of claim 10 wherein E is carbalkoxy.
13. The compound of claim 10 wherein E is cyano.
14. Ethyl 4-acetyl-3,5-dimethyl - 2,3 - dihydrofuran-2-carboxylate.

References Cited

Speziale et al.: J. Am. Chem. Soc., vol. 87, pp. 3760–2 (1965).

ALEX MAZEL, Primary Examiner

B. I. DENTZ, Assistant Examiner

U.S. Cl. X.R.

160—311; 260—347.8, 674